(12) United States Patent
Osborn et al.

(10) Patent No.: US 11,544,368 B2
(45) Date of Patent: *Jan. 3, 2023

(54) SECURE PASSWORD GENERATION AND MANAGEMENT USING NFC AND CONTACTLESS SMART CARDS

(71) Applicant: Capital One Services, LLC, McLean, VA (US)

(72) Inventors: Kevin Osborn, Newton, MA (US); Jeffrey Rule, Chevy Chase, MD (US)

(73) Assignee: Capital One Services, LLC, McLean, VA (US)

( * ) Notice: Subject to any disclaimer, the term of this patent is extended or adjusted under 35 U.S.C. 154(b) by 176 days.

This patent is subject to a terminal disclaimer.

(21) Appl. No.: 16/912,983

(22) Filed: Jun. 26, 2020

(65) Prior Publication Data

US 2021/0192035 A1     Jun. 24, 2021

Related U.S. Application Data

(63) Continuation of application No. 16/725,866, filed on Dec. 23, 2019, now Pat. No. 10,733,283.

(51) Int. Cl.
*G06F 21/35* (2013.01)
*G06F 21/46* (2013.01)
(Continued)

(52) U.S. Cl.
CPC .............. *G06F 21/35* (2013.01); *G06F 21/46* (2013.01); *H04L 9/0643* (2013.01);
(Continued)

(58) Field of Classification Search
CPC ........ G06F 21/34–35; G06F 21/45–46; G06Q 20/341–3415; G06Q 20/409–40975; H04L 9/0643; H04L 9/3228; H04L 9/3234; H04L 9/3236–3242; H04L 63/0492; H04L 63/083–0846; H04L 63/0853; H04L 2209/805; H04W 12/068
See application file for complete search history.

(56) References Cited

U.S. PATENT DOCUMENTS

2011/0099384 A1   4/2011   Grange et al.
2012/0295587 A1   11/2012  Paya et al.
2015/0188891 A1   7/2015   Grange et al.

FOREIGN PATENT DOCUMENTS

EP     1338940 A1     8/2003

OTHER PUBLICATIONS

International Search Report and Written Opinion for International Patent Application No. PCT/US2020/061867 dated Mar. 9, 2021, 11 pages.

*Primary Examiner* — Kevin Bechtel
(74) *Attorney, Agent, or Firm* — KDB

(57) ABSTRACT

Various embodiments are directed to securely generating and managing passwords using a near-field communication (NFC) enabled contactless smart card. For example, a secure password may be generated by generating a random number via a random number generator of the contactless smart card and converting the random number to one or more human-readable characters. In another example, a secure cryptographic hash function of the contactless smart card may generate a hash output value, which may be converted to one or more human-readable characters. The human-readable characters may be used as the secure password or it may be transformed to add more layers of security and complexity.

17 Claims, 10 Drawing Sheets

(51) Int. Cl.
  *H04L 9/06* (2006.01)
  *H04L 9/40* (2022.01)
  *H04W 12/06* (2021.01)
  *G06F 7/58* (2006.01)
(52) U.S. Cl.
  CPC ....... *H04L 63/0492* (2013.01); *H04W 12/068* (2021.01); *G06F 7/588* (2013.01)

SECURE PASSWORD GENERATION AND MANAGEMENT USING NFC AND CONTACTLESS SMART CARDS

RELATED APPLICATION

This application is a continuation of U.S. patent application Ser. No. 16/725,866, titled "SECURE PASSWORD GENERATION AND MANAGEMENT USING NFC AND CONTACTLESS SMART CARDS" filed on Dec. 23, 2019. The contents of the aforementioned application are incorporated herein by reference in their entirety.

BACKGROUND

A brute-force cracking attack is a commonly employed hacking technique, which may be used by a hacker to break into a computer, an e-mail account, an online banking account, an application, a website, or the like by manually guessing passwords. Thus, a strong, complex password may be essential for protecting a user from identity or financial theft.

A conventional password manager may assist in generating and retrieving complex passwords and may store such passwords in an encrypted database or may be calculated on demand. The conventional password manager may be a locally installed software application, an online service accessed through a website portal, or a locally accessed hardware device that serves as a key. Typically, conventional password managers require a user to generate and remember one "master" password to unlock and access any information stored in their databases.

Conventional password managers, however, are problematic in several ways. First, users may not always have in their possession the devices that run the password managers. Second, the randomness of a password generator used by the password manager may not be verifiable. Third, the password manager, no matter how strong, is only as effective as the user-created master password that protects it.

SUMMARY

Various embodiments are directed to securely generating and managing passwords using a near-field communication (NFC) enabled contactless smart card. For example, a secure password may be generated by generating a random number via a random number generator of the contactless smart card and converting the random number to one or more human-readable characters. In another example, a secure cryptographic hash function of the contactless smart card may generate a hash output value, which may be converted to one or more human-readable characters. The human-readable characters may be used as the secure password or it may be transformed to add more layers of security and complexity.

DETAILED DESCRIPTION

Figure 1A:
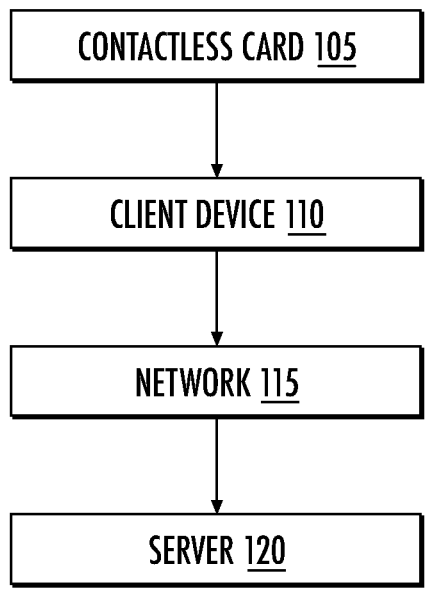
FIG. 1A illustrates an example data transmission system in accordance with one or more embodiments.

Various embodiments are generally directed to securely generating and managing one or more passwords using a near-field communication (NFC) enabled contactless smart card. For example, when an authorized NFC communication is established between a computing device, such as a mobile device (e.g., smartphone, laptop, tablet, etc.), and a contactless card, the contactless card may use at least one applet stored therein to generate a truly random, human-readable, and secure password.

According to one embodiment, a mobile device may request a secure password from a contactless card upon establishing and authenticating an NFC communication between the mobile device and the card. A random number generator of the contactless card may generate a random number having a predefined length. The random number may be converted into one or more human-readable characters, which may be used as the secure password, or in other examples, the one or more human-readable characters may be transformed by a password transformer to add additional layers of security to the password, e.g., rearranging the human-readable characters, replacing certain characters with other characters, etc. The secure password may be delivered to the mobile device in at least one NFC data exchange format (NDEF) file.

In some examples, a password manager application may be automatically opened on the mobile device when the mobile device establishes an authenticated communication with a specific contactless card such that only that specific contactless card may be able to open the password manager application. Thus, the physical contactless card itself may be used as the "master" password for the password manager, in some instances, along with the normal master password. Moreover, the contactless card may automatically and unilaterally generate and transmit one or more new secure passwords, which can be managed, organized, or used by the user on the password manager application according to the needs of the user.

According to another embodiment, a two-way communication protocol may be established between the mobile device and the contactless card for performing secure password generation. For example, upon establishing and authentication NFC communication, the mobile device may send a password request along with an identifier to the contactless card. The identifier may be any information associated with an application, a website, or a file requesting the password. For instance, a uniform resource locator (URL) associated with a website may be used as the identifier. The contactless card takes and inputs the identifier in a secure cryptographic hash function, which outputs a hash output value. The hash output value may be converted into one or more human-readable characters, which can be used as the password itself or may be further transformed by a password transformer to add additional security layers to the password. The password is then sent to the mobile device.

By requesting a secure password using an identifier, the contactless card (and only that contactless card) may be able to generate the same password for the same requester based on the unique cryptographic hash function included in the card. Thus, as long as the user uses the same contactless card, storage of the secure password in either the mobile device or the card itself is not required, which minimizes overall password exposure to potential hackers.

In further examples, when the contactless card is tapped to the mobile device or placed within a threshold distance from the mobile device, the mobile device may automatically fill (also referred to as "autofill") a password field with a secure password. The password may be a new password generated by the contactless card and stored and managed by a password manager on the mobile device, as described above, or the password may be a same password that can be requested by a same requester (e.g., application, website, file, etc.), as described above.

In previous solutions, the effectiveness of password managers was limited to the devices that they were installed on since users did not always have in their possession those devices. Moreover, the randomness of a password generator used by the password manager was not verifiable. Further, the password manager was only as strong as its "master" password protecting the manager from unauthorized access. The embodiments and examples described herein overcome and are advantageous over the previous solutions in that a highly secure and verifiable hardware component, such as an NFC enabled contactless smart card, may be used to generate truly random, human-readable passwords, in some examples, without having to store the generated passwords in the contactless card and/or the mobile device, which minimizes breach exposure by eliminating key pieces of data that can be hacked. Also, since the contactless card itself (along with the master password in some instances) can be used to open a password manager application on the mobile device, the physical card may act as the "master" password, which overcomes the above-described weakest-link problem relating to most password manager applications.

Reference is now made to the drawings, where like reference numerals are used to refer to like elements throughout. In the following description, for the purpose of explanation, numerous specific details are set forth in order to provide a thorough understanding thereof. It may be evident, however, that the novel embodiments can be practiced without these specific details. In other instances, well-known structures and devices are shown in block diagram form to facilitate a description thereof. The intention is to cover all modification, equivalents, and alternatives within the scope of the claims.

FIG. 1A illustrates an example data transmission system according to one or more embodiments. As will be further discussed below, system 100 may include contactless card 105, client device 110, network 115, and server 120. Although FIG. 1A illustrates single instances of the components; system 100 may include any number of components.

System 100 may include one or more contactless cards 105, which are further explained below with reference to FIG. 3A and FIG. 3B. In some embodiments, contactless card 105 may be in wireless communication, utilizing NFC in an example, with client device 110.

System 100 may include client device 110, which may be a network-enabled computer. As referred to herein, a network-enabled computer may include, but is not limited to a computer device, or communications device including, e.g., a server, a network appliance, a personal computer, a workstation, a phone, a smartphone, a handheld PC, a personal digital assistant, a thin client, a fat client, an Internet browser, or other device. Client device 110 also may be a mobile computing device, for example, an iPhone, iPod, iPad from Apple® or any other suitable device running Apple's iOS® operating system, any device running Microsoft's Windows® Mobile operating system, any device running Google's Android® operating system, and/or any other suitable mobile computing device, such as a smartphone, a tablet, or like wearable mobile device.

The client device 110 device can include a processor and a memory, and it is understood that the processing circuitry may contain additional components, including processors, memories, error and parity/CRC checkers, data encoders, anti-collision algorithms, controllers, command decoders, security primitives, and tamper-proofing hardware, as necessary to perform the functions described herein. The client device 110 may further include a display and input devices. The display may be any type of device for presenting visual information such as a computer monitor, a flat panel display, and a mobile device screen, including liquid crystal displays, light-emitting diode displays, plasma panels, and cathode ray tube displays. The input devices may include any device for entering information into the user's device that is available and supported by the user's device, such as a touch-screen, keyboard, mouse, cursor-control device, touch-screen, microphone, digital camera, video recorder or camcorder. These devices may be used to enter information and interact with the software and other devices described herein.

In some examples, client device 110 of system 100 may execute one or more applications, such as software applications, that enable, for example, network communications with one or more components of system 100 and transmit and/or receive data.

Client device 110 may be in communication with one or more servers 120 via one or more networks 115 and may operate as a respective front-end to back-end pair with server 120. Client device 110 may transmit, for example, from a mobile device application executing on client device 110, one or more requests to server 120. The one or more requests may be associated with retrieving data from server 120. Server 120 may receive the one or more requests from client device 110. Based on the one or more requests from client device 110, server 120 may be configured to retrieve the requested data from one or more databases (not shown). Based on receipt of the requested data from the one or more databases, server 120 may be configured to transmit the received data to client device 110, the received data being responsive to one or more requests.

System 100 may include one or more networks 115. In some examples, network 115 may be one or more of a wireless network, a wired network or any combination of wireless network and wired network and may be configured to connect client device 110 to server 120. For example, network 115 may include one or more of a fiber optics network, a passive optical network, a cable network, an Internet network, a satellite network, a wireless local area network (LAN), a Global System for Mobile Communication, a Personal Communication Service, a Personal Area Network, Wireless Application Protocol, Multimedia Messaging Service, Enhanced Messaging Service, Short Message Service, Time Division Multiplexing based systems, Code Division Multiple Access (CDMA) based systems, D-AMPS, Wi-Fi, Fixed Wireless Data, IEEE 802.11b, 802.15.1, 802.11n and 802.11g, Bluetooth, NFC, Radio Frequency Identification (RFID), Wi-Fi, and/or the like.

In addition, network 115 may include, without limitation, telephone lines, fiber optics, IEEE Ethernet 802.3, a wide area network, a wireless personal area network, a LAN, or a global network such as the Internet. In addition, network 115 may support an Internet network, a wireless communication network, a cellular network, or the like, or any combination thereof. Network 115 may further include one network, or any number of the exemplary types of networks mentioned above, operating as a stand-alone network or in cooperation with each other. Network 115 may utilize one or more protocols of one or more network elements to which they are communicatively coupled. Network 115 may translate to or from other protocols to one or more protocols of network devices. Although network 115 is depicted as a single network, it should be appreciated that according to one or more examples, network 115 may include a plurality of interconnected networks, such as, for example, the Internet, a service provider's network, a cable television network, corporate networks, such as credit card association networks, and home networks.

System 100 may include one or more servers 120. In some examples, server 120 may include one or more processors, which are coupled to the memory. Server 120 may be configured as a central system, server or platform to control and call various data at different times to execute a plurality of workflow actions. Server 120 may be configured to connect to the one or more databases. Server 120 may be connected to at least one client device 110.

Figure 1B:
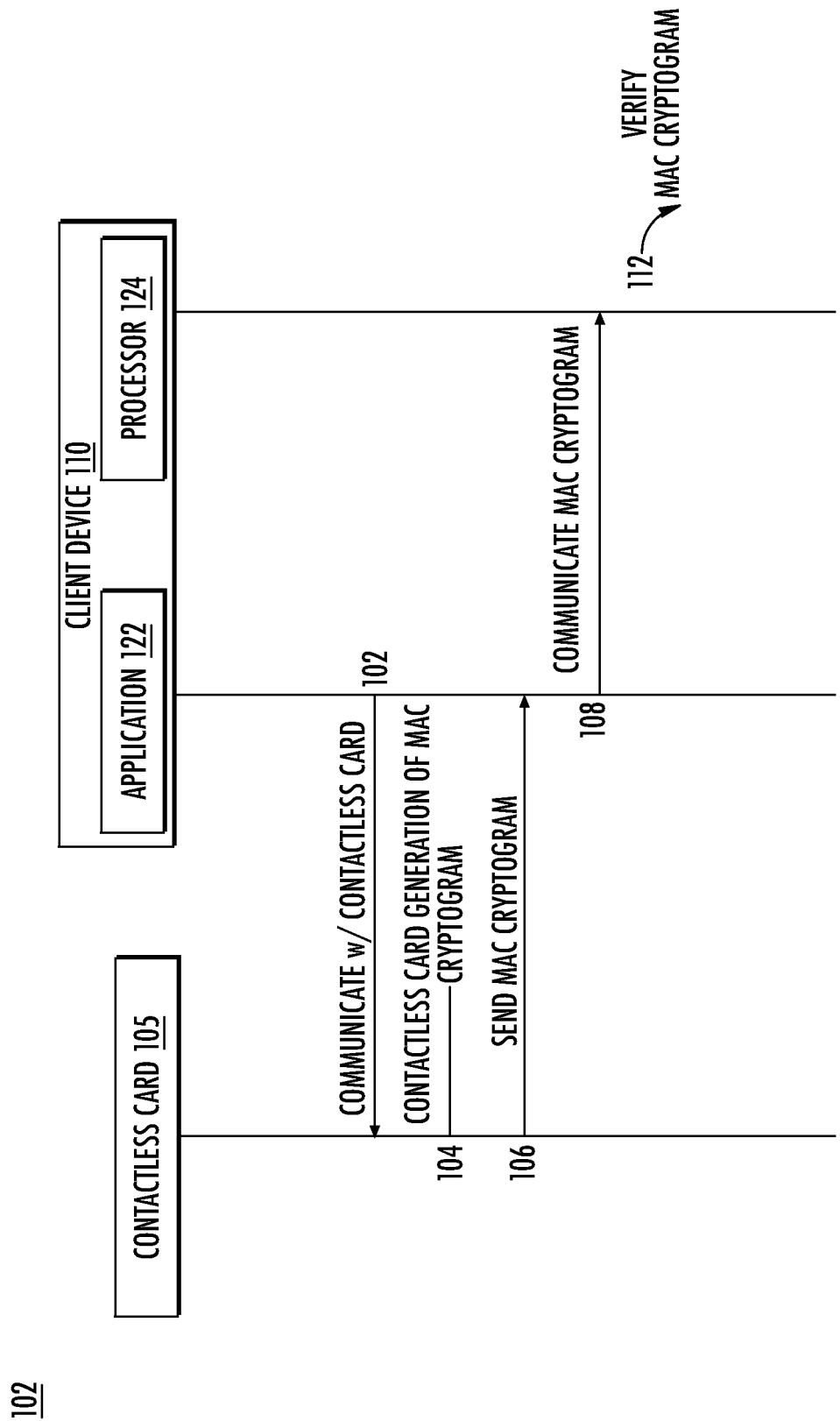
FIG. 1B illustrates an example sequence diagram for providing authenticated access in accordance with one or more embodiments.

FIG. 1B illustrates an example sequence diagram for providing authenticated access according to one or more embodiments. The diagram may include contactless card 105 and client device 110, which may include an application 122 and processor 124. FIG. 1B may reference similar components as illustrated in FIG. 1A.

At step 102, the application 122 communicates with the contactless card 105 (e.g., after the card 105 is brought near the device 110, after the card 105 is tapped to the device 110, etc.). Communication between the application 122 and the contactless card 105 may involve the contactless card 105 being sufficiently close to a card reader (not shown) of the client device 110 to enable NFC data transfer between the application 122 and the contactless card 105.

At step 104, after communication has been established between client device 110 and contactless card 105, the contactless card 105 generates a message authentication code (MAC) cryptogram. In some examples, this may occur when the contactless card 105 is read by the application 122. In particular, this may occur upon a read, such as an NFC read, of an NDEF tag, which may be created in accordance with the NFC Data Exchange Format.

For example, a reader, such as application 122, may transmit a message, such as an applet select message, with the applet ID of an NDEF producing applet. Upon confirmation of the selection, a sequence of select file messages followed by read file messages may be transmitted. For example, the sequence may include "Select Capabilities file," "Read Capabilities file," and "Select NDEF file." At this point, a counter value maintained by the contactless card 105 may be updated or incremented, which may be followed by "Read NDEF file." At this point, the message may be generated which may include a header and a shared secret. Session keys may then be generated. The MAC cryptogram may be created from the message, which may include the header and the shared secret. The MAC cryptogram may then be concatenated with one or more blocks of random data, and the MAC cryptogram and a random number (RND) may be encrypted with the session key. Thereafter, the cryptogram and the header may be concatenated, and encoded as ASCII hex and returned in NDEF message format (responsive to the "Read NDEF file" message).

In some examples, the MAC cryptogram may be transmitted as an NDEF tag, and in other examples, the MAC cryptogram may be included with a uniform resource indicator (e.g., as a formatted string).

In some examples, application 122 may be configured to transmit a request to contactless card 105, the request comprising an instruction to generate a MAC cryptogram.

At step 106, the contactless card 105 sends the MAC cryptogram to the application 122. In some examples, the transmission of the MAC cryptogram occurs via NFC. However, the present disclosure is not limited thereto. In other examples, this communication may occur via Bluetooth, Wi-Fi, or other means of wireless data communication.

At step 108, the application 122 communicates the MAC cryptogram to the processor 124. At step 112, the processor 124 verifies the MAC cryptogram pursuant to an instruction from the application 122. For example, the MAC cryptogram may be verified, as explained below.

In some examples, verifying the MAC cryptogram may be performed by a device other than client device 110, such as a server 120 in data communication with the client device 110 (as shown in FIG. 1A). For example, processor 124 may output the MAC cryptogram for transmission to server 120, which may verify the MAC cryptogram.

In some examples, the MAC cryptogram may function as a digital signature for purposes of verification. Other digital signature algorithms, such as public key asymmetric algorithms, e.g., the Digital Signature Algorithm and the RSA algorithm, or zero knowledge protocols, may be used to perform this verification.

It may be understood that in some examples, the contactless card 105 may initiate communication after the contactless card is brought near the client device 110. By way of example, the contactless card 105 may send the client device 110 a message, for instance, indicating that the contactless card has established communication. Thereafter, the application 122 of client device 110 may proceed to communicate with the contactless card at step 102, as described above.

Figure 2:
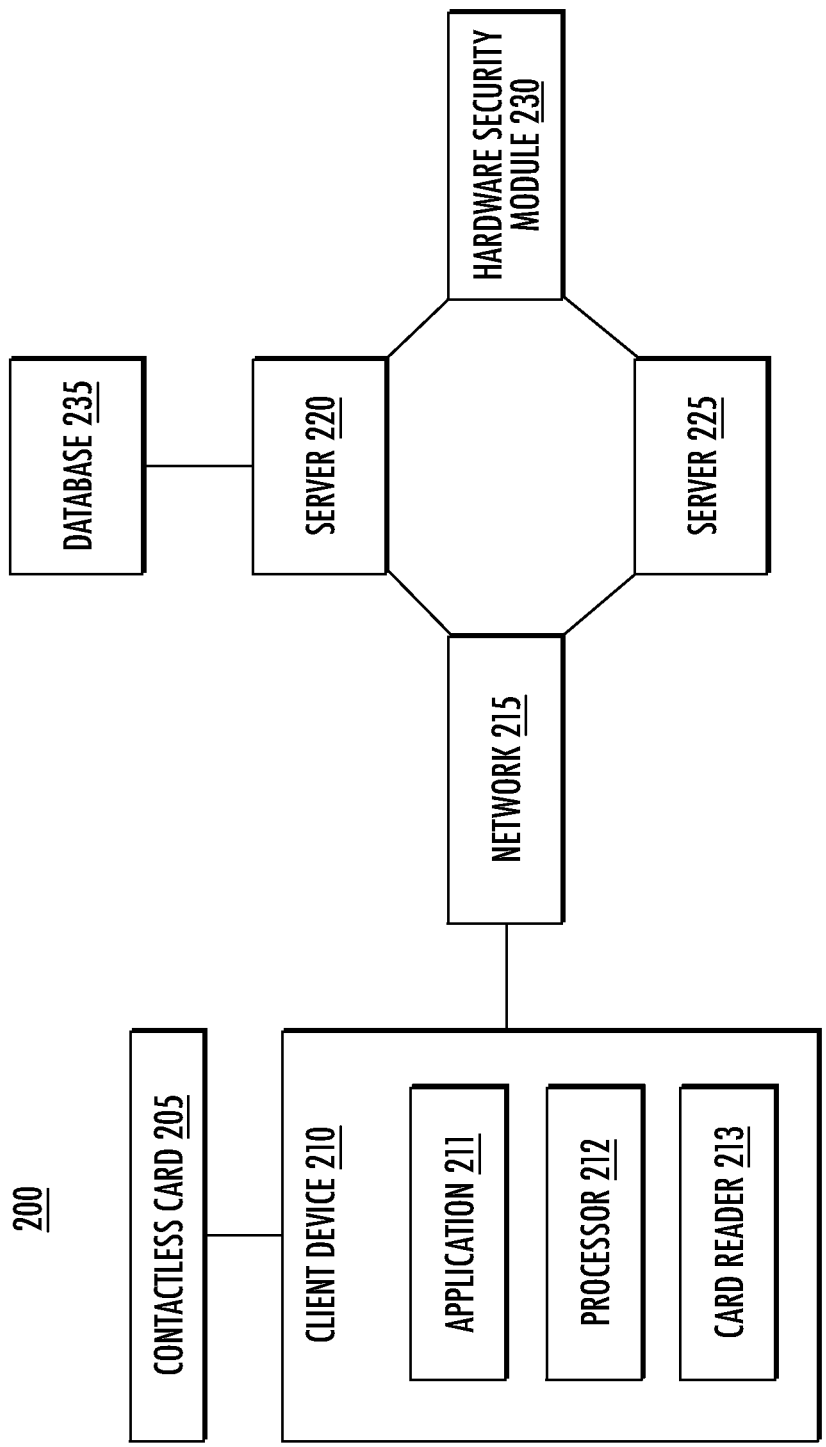
FIG. 2 illustrates an example system using a contactless card in accordance with one or more embodiments.

FIG. 2 illustrates an example system 200 using a contactless card. System 200 may include a contactless card 205, one or more client devices 210, network 215, servers 220, 225, one or more hardware security modules 230, and a database 235. Although FIG. 2 illustrates single instances of the components, system 200 may include any number of components.

System 200 may include one or more contactless cards 205, which are further explained below with respect to FIG. 3A and FIG. 3B. In some examples, contactless card 205 may be in wireless communication, for example, NFC communication, with client device 210. For example, contactless card 205 may include one or more chips, such as a radio frequency identification chip, configured to communicate via NFC or other short-range protocols. In other embodiments, contactless card 205 may communicate with client device 210 through other means including, but not limited to, Bluetooth, satellite, Wi-Fi, wired communications, and/or any combination of wireless and wired connections. According to some embodiments, contactless card 205 may be configured to communicate with card reader 213 (which may otherwise be referred to herein as NFC reader, NFC card reader, or reader) of client device 210 through NFC when the contactless card 205 is within range of card reader 213. In other examples, communications with contactless card 205 may be accomplished through a physical interface, e.g., a universal serial bus interface or a card swipe interface.

System 200 may include client device 210, which may be a network-enabled computer. As referred to herein, a network-enabled computer may include, but is not limited to: e.g., a computer device, or communications device including, e.g., a server, a network appliance, a personal computer, a workstation, a mobile device, a phone, a handheld PC, a personal digital assistant, a thin client, a fat client, an Internet browser, or other device. One or more client devices 210 also may be a mobile device; for example, a mobile device may include an iPhone, iPod, iPad from Apple® or any other mobile device running Apple's iOS® operating system, any device running Microsoft's Windows® Mobile operating system, any device running Google's Android® operating system, and/or any other smartphone or like wearable mobile device. In some examples, the client device 210 may be the same as, or similar to, a client device 110 as described with reference to FIG. 1A or FIG. 1B.

Client device 210 may be in communication with one or more servers 220 and 225 via one or more networks 215. Client device 210 may transmit, for example from an application 211 executing on client device 210, one or more requests to one or more servers 220 and 225. The one or more requests may be associated with retrieving data from one or more servers 220 and 225. Servers 220 and 225 may receive the one or more requests from client device 210. Based on the one or more requests from client device 210, one or more servers 220 and 225 may be configured to retrieve the requested data from one or more databases 235. Based on receipt of the requested data from the one or more databases 235, one or more servers 220 and 225 may be configured to transmit the received data to client device 210, the received data being responsive to one or more requests.

System 200 may include one or more hardware security modules (HSM) 230. For example, one or more HSMs 230 may be configured to perform one or more cryptographic operations as disclosed herein. In some examples, one or more HSMs 230 may be configured as special purpose security devices that are configured to perform the one or more cryptographic operations. The HSMs 230 may be configured such that keys are never revealed outside the HSM 230, and instead, are maintained within the HSM 230. For example, one or more HSMs 230 may be configured to perform at least one of key derivations, decryption, and MAC operations. The one or more HSMs 230 may be contained within or may be in data communication with, servers 220 and 225.

System 200 may include one or more networks 215. In some examples, network 215 may be one or more of a wireless network, a wired network or any combination of wireless network and wired network, and may be configured to connect client device 210 to servers 220 and/or 225. For example, network 215 may include one or more of a fiber optics network, a passive optical network, a cable network, a cellular network, an Internet network, a satellite network, a wireless LAN, a Global System for Mobile Communication, a Personal Communication Service, a Personal Area Network, Wireless Application Protocol, Multimedia Messaging Service, Enhanced Messaging Service, Short Message Service, Time Division Multiplexing based systems, Code Division Multiple Access based (CDMA) systems, D-AMPS, Wi-Fi, Fixed Wireless Data, IEEE 802.11b, 802.15.1, 802.11n and 802.11g, Bluetooth, NFC, RFID, Wi-Fi, and/or any combination of networks thereof. As a non-limiting example, communications from contactless card 205 and client device 210 may include NFC communication, the cellular network between client device 210 and a carrier, and Internet between the carrier and a back-end.

In addition, network 215 may include, without limitation, telephone lines, fiber optics, IEEE Ethernet 802.3, a wide area network, a wireless personal area network, a local area network, or a global network such as the Internet. In addition, network 215 may support an Internet network, a wireless communication network, a cellular network, or the like, or any combination thereof. Network 215 may further include one network, or any number of the exemplary types of networks mentioned above, operating as a stand-alone network or in cooperation with each other. Network 215 may utilize one or more protocols of one or more network elements to which they are communicatively coupled. Network 215 may translate to or from other protocols to one or more protocols of network devices. Although network 215 is depicted as a single network, it should be appreciated that according to one or more examples, network 215 may include a plurality of interconnected networks, such as, for example, the Internet, a service provider's network, a cable television network, corporate networks, such as credit card association networks, and home networks.

In various examples according to the present disclosure, client device 210 of system 200 may execute one or more applications 211 and include one or more processors 212, and one or more card readers 213. For example, one or more applications 211, such as software applications, may be configured to enable, for example, network communications with one or more components of system 200 and transmit and/or receive data. It is understood that although only single instances of the components of client device 210 are illustrated in FIG. 2, any number of devices 210 may be used. Card reader 213 may be configured to read from and/or communicate with contactless card 205. In conjunction with the one or more applications 211, card reader 213 may communicate with the contactless card 205. In examples, the card reader 213 may include circuitry or circuitry components, e.g., NFC reader coil, that generates a magnetic field to allow communication between the client device 210 and the contactless card 205.

The application 211 of any of client device 210 may communicate with the contactless card 205 using short-range wireless communication (e.g., NFC). The application 211 may be configured to interface with a card reader 213 of client device 210 configured to communicate with a contactless card 205. As should be noted, those skilled in the art would understand that a distance of less than twenty centimeters is consistent with NFC range.

In some embodiments, the application 211 communicates through an associated reader (e.g., card reader 213) with the contactless card 205.

In some embodiments, card activation may occur without user authentication. For example, a contactless card 205 may communicate with the application 211 through the card reader 213 of the client device 210 through NFC. The communication (e.g., a tap of the card proximate the card reader 213 of the client device 210) allows the application 211 to read the data associated with the card and perform an activation. In some cases, the tap may activate or launch application 211 and then initiate one or more actions or communications with an account server 225 to activate the card for subsequent use. In some cases, if the application 211 is not installed on client device 210, a tap of the card against the card reader 213 may initiate a download of the application 211 (e.g., navigation to an application download page). Subsequent to installation, a tap of the card may activate or launch the application 211, and then initiate (e.g., via the application or other back-end communication) activation of the card. After activation, the card may be used in various transactions including commercial transactions.

According to some embodiments, the contactless card 205 may include a virtual payment card. In those embodiments, the application 211 may retrieve information associated with the contactless card 205 by accessing a digital wallet implemented on the client device 210, wherein the digital wallet includes the virtual payment card. In some examples, virtual payment card data may include one or more static or dynamically generated virtual card numbers.

Server 220 may include a web server in communication with database 235. Server 225 may include an account server. In some examples, server 220 may be configured to validate one or more credentials from contactless card 205 and/or client device 210 by comparison with one or more credentials in database 235. Server 225 may be configured to authorize one or more requests, such as payment and transaction, from contactless card 205 and/or client device 210.

Figure 3A:
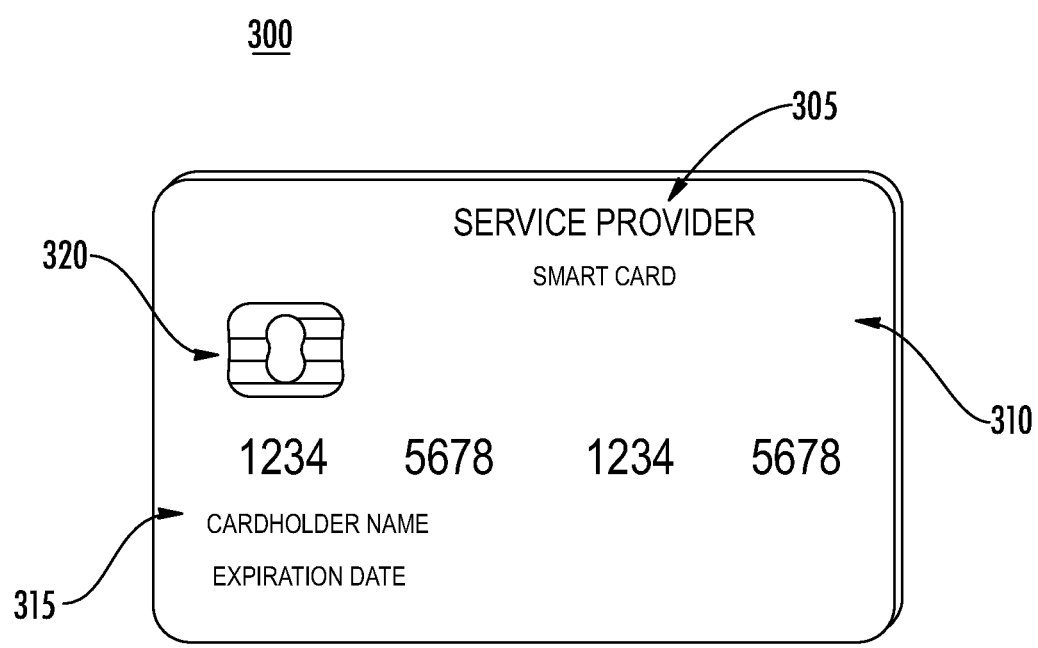
FIG. 3A illustrates an example contactless card in accordance with one or more embodiments.

FIG. 3A illustrates one or more contactless cards 300, which may include a payment card, such as a credit card, debit card, or gift card, issued by a service provider 305 displayed on the front or back of the card 300. In some examples, the contactless card 300 is not related to a payment card and may include, without limitation, an identification card. In some examples, the payment card may include a dual interface contactless payment card. The contactless card 300 may include a substrate 310, which may include a single layer or one or more laminated layers composed of plastics, metals, and other materials. Exemplary substrate materials include polyvinyl chloride, polyvinyl chloride acetate, acrylonitrile butadiene styrene, polycarbonate, polyesters, anodized titanium, palladium, gold, carbon, paper, and biodegradable materials. In some examples, the contactless card 300 may have physical characteristics compliant with the ID-1 format of the ISO/IEC 7810 standard, and the contactless card may otherwise be compliant with the ISO/IEC 14443 standard. However, it is understood that the contactless card 300 according to the present disclosure may have different characteristics, and the present disclosure does not require a contactless card to be implemented in a payment card.

The contactless card 300 may also include identification information 315 displayed on the front and/or back of the card, and a contact pad 320. The contact pad 320 may be configured to establish contact with another communication device, such as a user device, smart phone, laptop, desktop, or tablet computer. The contactless card 300 may also include processing circuitry, antenna and other components not shown in FIG. 3A. These components may be located behind the contact pad 320 or elsewhere on the substrate 310. The contactless card 300 may also include a magnetic strip or tape, which may be located on the back of the card (not shown in FIG. 3A).

Figure 3B:
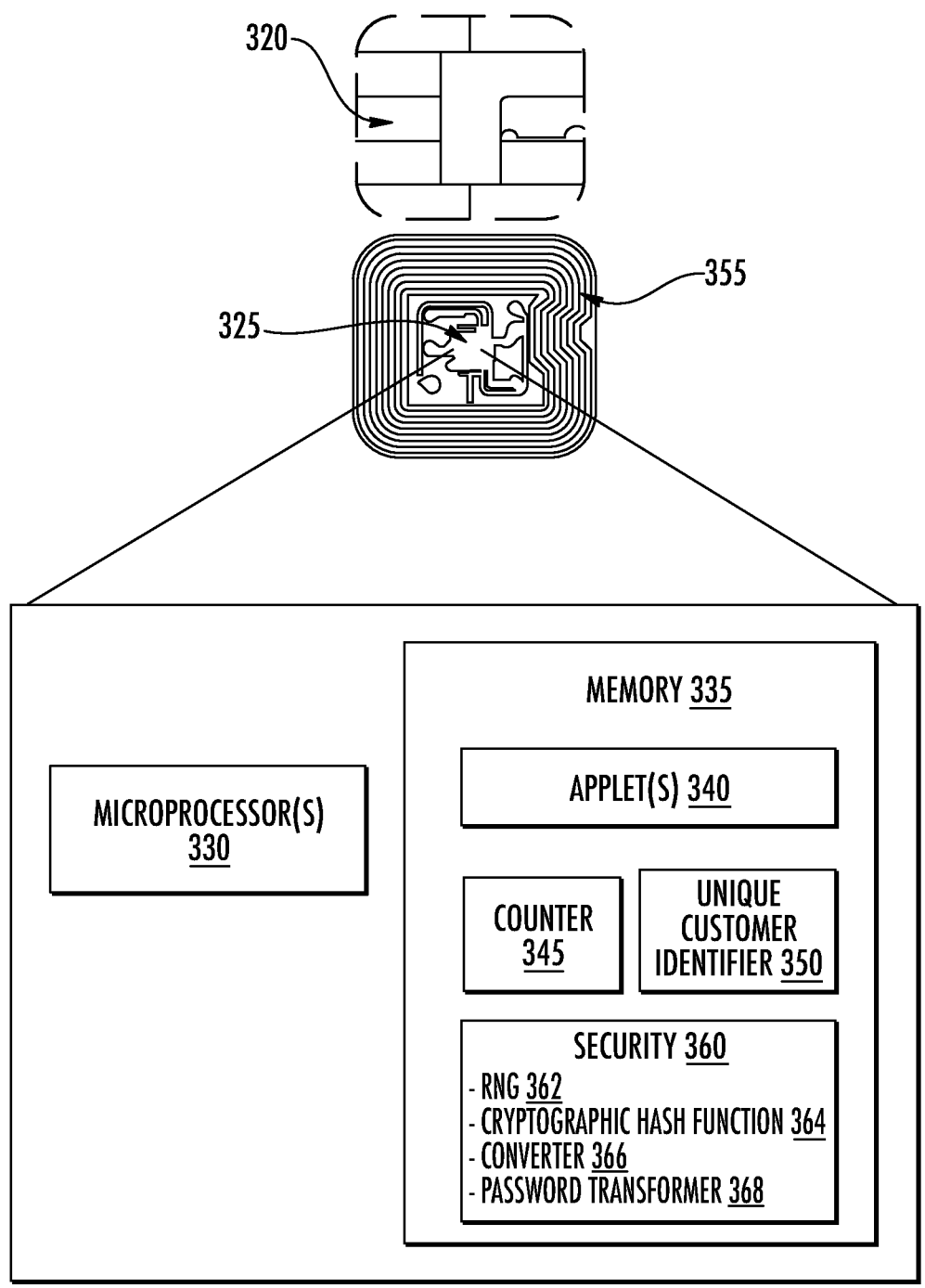
FIG. 3B illustrates an example contact pad of a contactless card in accordance with one or more embodiments.

As illustrated in FIG. 3B, the contact pad 320 of FIG. 3A may include processing circuitry 325 for storing and processing information, including a microprocessor 330 and a memory 335. It is understood that the processing circuitry 325 may contain additional components, including processors, memories, error and parity/CRC checkers, data encoders, anti-collision algorithms, controllers, command decoders, security primitives and tamper-proofing hardware, as necessary to perform the functions described herein.

The memory 335 may be a read-only memory, write-once read-multiple memory or read/write memory, e.g., RAM, ROM, and EEPROM, and the contactless card 300 may include one or more of these memories. A read-only memory may be factory programmable as read-only or one-time programmable. One-time programmability provides the opportunity to write once then read many times. A write once/read-multiple memory may be programmed at a point in time after the memory chip has left the factory. Once the memory is programmed, it may not be rewritten, but it may be read many times. A read/write memory may be programmed and re-programmed many times after leaving the factory. It may also be read many times.

The memory 335 may be configured to store one or more applets 340, one or more counters 345, a customer identifier 350, and other types of data, information, code, etc., such as features related to security 360. The one or more applets 340 may include one or more software applications configured to execute on one or more contactless cards, such as Java Card applet. However, it is understood that applets 340 are not limited to Java Card applets, and instead may be any software application operable on contactless cards or other devices having limited memory. The one or more counters 345 may include a numeric counter sufficient to store an integer. The customer identifier 350 may include a unique alphanumeric identifier assigned to a user of the contactless card 300, and the identifier may distinguish the user of the contactless card from other contactless card users. In some examples, the customer identifier 350 may identify both a customer and an account assigned to that customer and may further identify the contactless card associated with the customer's account.

Moreover, the security features 360 may include a random number generator (RNG) 362, one or more cryptographic hash functions 364 unique to the contactless card 300, a converter 336 for converting random numbers or hash output values to human-readable characters, and a password transformer 368 configured optionally layer additional security to the password by transforming the human-readable characters output by the converter 366. It may be understood that the random number generator 362, for example, may be used and built into the contactless card 300 for other types of security-based functionalities, such as cryptography.

The processor and memory elements of the foregoing exemplary embodiments are described with reference to the contact pad, but the present disclosure is not limited thereto. It is understood that these elements may be implemented outside of the pad 320 or entirely separate from it or as further elements in addition to processor 330 and memory 335 elements located within the contact pad 320.

In some examples, the contactless card 300 may include one or more antennas 355. The one or more antennas 355 may be placed within the contactless card 300 and around the processing circuitry 325 of the contact pad 320. For example, the one or more antennas 355 may be integral with the processing circuitry 325 and the one or more antennas 355 may be used with an external booster coil. As another example, the one or more antennas 355 may be external to the contact pad 320 and the processing circuitry 325.

In an embodiment, the coil of contactless card 300 may act as the secondary of an air core transformer. The terminal may communicate with the contactless card 300 by cutting power or amplitude modulation. The contactless card 300 may infer the data transmitted from the terminal using the gaps in the contactless card's power connection, which may be functionally maintained through one or more capacitors. The contactless card 300 may communicate back by switching a load on the contactless card's coil or load modulation. Load modulation may be detected in the terminal's coil through interference.

As explained above, the contactless cards 300 may be built on a software platform operable on smart cards or other devices having limited memory, such as JavaCard, and one or more or more applications or applets may be securely executed. Applets may be added to contactless cards to provide a one-time password (OTP) for multifactor authentication (MFA) in various mobile application-based use cases. Applets may be configured to respond to one or more requests, such as near field data exchange requests, from a reader, such as a mobile NFC reader, and produce an NDEF message that includes a cryptographically secure OTP encoded as an NDEF text tag.

Figure 4:
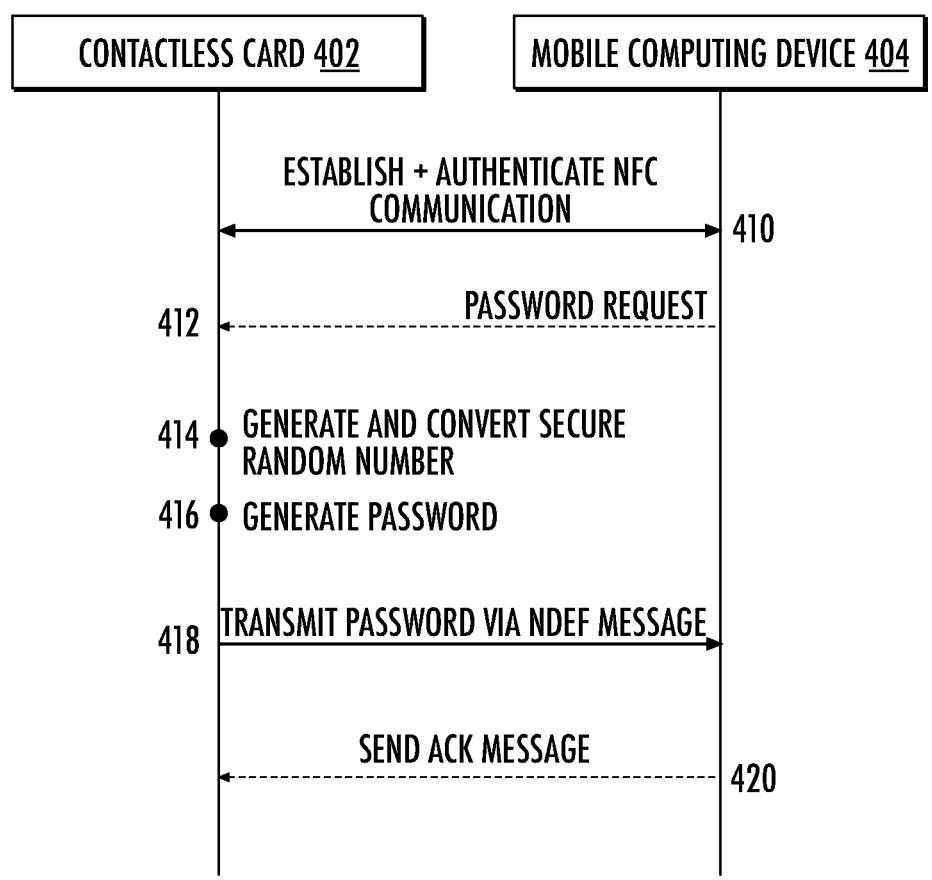
FIG. 4 illustrates an example sequence diagram relating to secure password generation in accordance with one or more embodiments.

FIG. 4 illustrates an example sequence diagram 400 of generating a secure password using a random number generator of a contactless card according to one or more embodiments. The sequence diagram 400 shows an interaction between a contactless card 400 and a mobile computing device 404. It may be understood that the mobile computing device 404 may be a client device, such as a smartphone configured to communicate with the contactless card 402. As described above, the mobile computing device 404 may include at least an NFC card reader configured to establish NFC communication with the contactless card via an NFC reader coil.

At step 410, communication may be established between the contactless card 402 and the mobile computing device 404. In examples, the communication may be automatically established upon the contactless card entering the magnetic field generated by the NFC reader coil of the mobile computing device. In other examples, the mobile computing device 404 may first establish communication by sending the contactless card 402 a signal when the computing device 404 detects that the contactless card 402 has entered the magnetic field generated by the NFC reader coil. It may be understood that step 410 may be an optional step. In examples, the contactless card may automatically start providing messages to the mobile computing device 404 as soon as the card enters the magnetic field of the NFC reader coil of the mobile computing device.

At step 412, the mobile computing device 404 may request a secure password from the contactless card 402. For example, a password manager application running on the mobile computing device may request the password for a new social media account that is being created. The password manager application may store and manage the secure password on the mobile computing device 404. It may be understood that step 412 may be an optional step, as indicated by the dashed arrow. In some examples, the mobile computing device does not have to request the password. The contactless card 402 may automatically generate and send a secure password upon the establishment and authentication of the NFC communication between the card and the mobile device, particularly when the contactless card 402 determines (e.g., via the NFC communication establishment and authentication process) that a password-related application, program, website, file, etc. is attempting to interface with the contactless card 402.

At step 414, a random number generator of the contactless card 402 may generate a random number having a predetermined or dynamically length. For instance, if the above-described social media account requires that that the password be of a certain length, then the random number generator may output a random number with sufficient length accordingly. In examples, the secure random number may be converted to one or more human-readable characters. If a sequence of random numbers is "123 456 789," then that sequence may be converted to "AyTer" or any other combination of alphanumeric characters readable or retainable by a user. The conversion of the numbers, for instance, may be based on a code-based cryptography system, a key-based cryptography system, etc.

At step 416, the secure password is generated by the contactless card 402. According to examples, the secure password may be the one or more human-readable characters generated at step 414 without any alteration. In other examples, and as will be further described below, the one or more human-readable characters may be further transformed so that additional layers of security may be added thereto. For example, the above-mentioned character string "AyTer" may be transformed to "YeRTAP!" which involves rearranging and capitalizing some of the letters and adding a couple more characters to the string. It may be understood that the transformation may be any suitable modification that increases overall security and complexity of the password.

At step 418, the secure password may be sent to the mobile computing device 404 via one or more NDEF messages or files. The password itself or the entire NDEF message or file may be appropriately encrypted to further enhance secure communication of the password. At step 420, the mobile computing device 404 may optionally (as indicated by the dashed arrow) transmit an acknowledgment (ACK) message to the contactless card 402 indicating and confirming receipt of the secure password.

At step 420, the NDEF message is once again assessed. The mobile computing device 404 may calculate a new checksum for the NDEF message received at step 418 and determine whether it matches the checksum provided in the NDEF message. If the checksums match, the mobile computing device 404 may optionally send an acknowledgment (ACK) message at step 422, as shown by the dashed arrow. If the checksums do not match, the NDEF message may be provided yet again to the mobile computing device 404 and further assessed. This process may continue until the entire NDEF message has been received by the mobile computing device 404. In other examples, the entire process may stop after a predetermined number of iterations or a predetermined duration of time. An error message may be returned to the user via a user interface if the mobile computing device 404 fails to read the entire NDEF message after the predetermined number of iterations or the predetermined duration of time.

Figure 5:
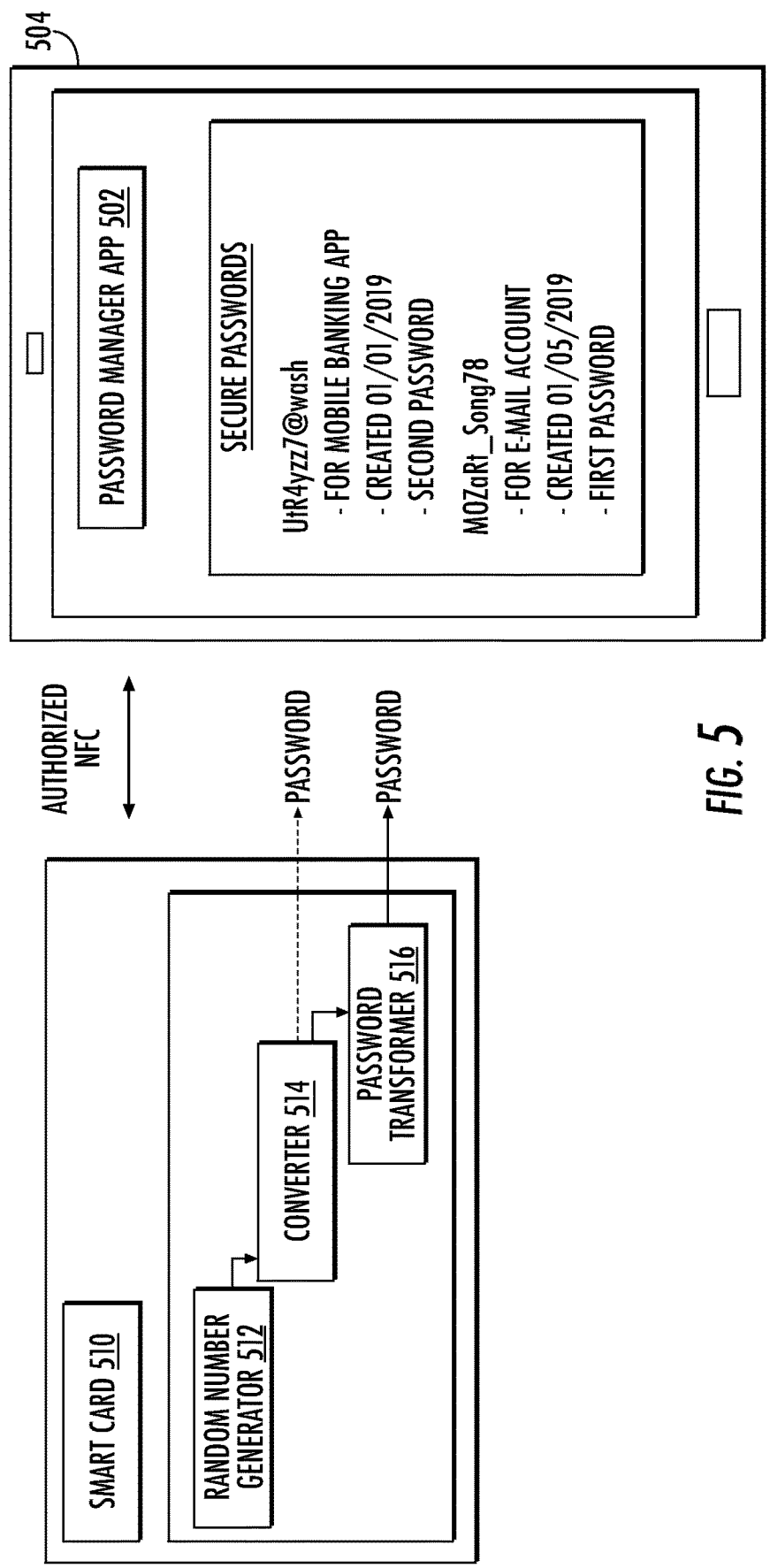
FIG. 5 illustrates an example password manager application and secure password generation in accordance with one or more embodiments.

FIG. 5 illustrates a password manager application 502 and secure password generation according to one or more embodiments. As shown, the password manager application 502 may be opened on mobile computing device 504, which may be a smartphone belonging to a user. The password manager application 502 may maintain and organize various passwords for numerous services and displays relevant information for each password. For example, the first shown password, "UtR4yzz7@wash" may correspond to a mobile banking application that was created on Jan. 1, 2019 and is the second password that the password manager has created for the banking application.

By way of example, the user may be setting up a new e-mail account, which requires the user to select a secure password. The user may either tap a contactless smart card 510 to the mobile computing device 504 or place the card 510 near the mobile computing device 504 (e.g., at a predefined threshold distance) to establish a secure and authorized NFC communication between the card 510 and the mobile device 504. In embodiments, when the contactless smart card 510 establishes the secure and authorized NFC communication with the mobile computing device 502, the user may be presented with various smartphone applications that relate to the card 510, e.g., online banking application, transit application, password manager application 502, etc. The user may select the desired application, which allows the mobile computing device 504 to instruct the contactless smart card 510 to perform appropriate functions. Thus, when the user selects the password manager application 502, the card 510 knows to generate (or will generate) a secure password. In alternative embodiments, the password manager application 502 may be set as the default function, and thus, the contactless smart card 510 may automatically generate a secure password when secure and authorized NFC communication is established between the mobile device 504 and the card 510.

As illustrated, the contactless smart card 510 uses a random number generator 512 to generate a random number. As described above, it may be understood that the random number generator 512 may be used for other purposes, such as cryptography. The random number may then be converted into one or more human-readable characters by converter 514. For example, a random sequence of only numbers may be converted to a sequence of alphanumeric characters that is more relatable and usable by the user. At this point, the one or more human-readable characters may be sent to the password manager application 502 as the password that the user may use for the new e-mail account, as indicated by the dashed arrow. As described above, however, the one or more human-readable characters may be transformed by a password transformer 516, e.g., the characters rearranged, some characters capitalized, some characters lower-cased, the addition or subtraction of some characters, etc. The transformation may add more layers of complexity and security to the password.

The contactless smart card 510 may send the secure password via at least one NDEF message or file to the mobile computing device 504. The password manager application 502 then stores and manage the password therein. As shown, the generated secure password for the new e-mail account may be a transformed password and recites "MOZaRt_Song78," which is indicated in the password manager as being the password for the user's e-mail account that was created on Jan. 5, 2019 in the first instance. The creation and management of this password for the user is understood to be highly secure for various reasons. For example, the random number generator 512 of the contactless smart card 510 is verifiably secure and uniquely associated with the user since the card belongs to the user and only the user. In another example, the contactless smart card 510 itself may be used to open the password manager application 502 (along with an additional password input), which effectively acts as the "master" password for the application. Thus, the password manager application 502 cannot be opened by a fraudster without the physical card. Moreover, in some examples, the contactless smart card 510 may store some or all of the passwords, which may then be managed by the password manager application 502 when opened on the mobile computing device. Accordingly, a fraudster will not have access to the passwords without having physical possession of the card 510.

It may be understood that the password manager application 502 illustrated in FIG. 5 is for illustrative purposes only and not limited thereto. The application may include additional features for securely storing and managing the passwords. Moreover, it may be understood that the components shown in the contactless smart card 510, e.g., the random number generator 512, the converter 514, the password transformer 516, may all be executed or implemented by the one or more processors or microprocessors integrated into the card 510.

Figure 6:
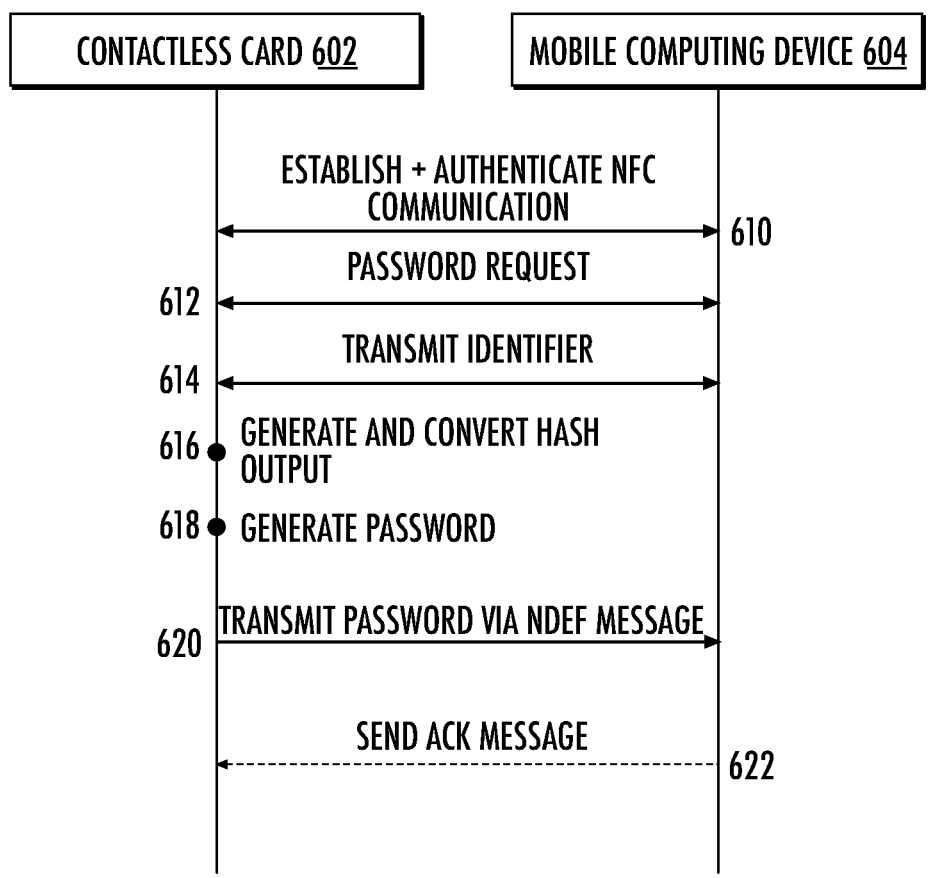
FIG. 6 illustrates another example of a sequence diagram relating to secure password generation in accordance with one or more embodiments.

FIG. 6 illustrates an example sequence diagram 600 of generating a secure password using a cryptographic hash function of a contactless card according to one or more embodiments. The sequence diagram 600 shows a two-way communication protocol between a contactless card 602 and a mobile computing device 604.

At step 610, similar to the sequence diagram shown in FIG. 4, a secure and authenticated NFC communication may be established between the contactless card 602 and the mobile computing device 604. For example, the contactless card 602 may be tapped to the mobile computing device 604 or placed near the device 604 (e.g., to a predefined distance) to initiate the communication.

At step 612, the mobile computing device 604 may request a secure password from the contactless card 602. With or after (step 614) the password request, the mobile computing device 604 may transmit an identifier associated with the "requesting" component or entity. For example, if a user is creating a new account on a website, the website or the entity controlling the website may request that the user create a new password corresponding to that new account. Thus, the "requesting" component or entity may be the website. The identifier may be any information that uniquely identifies or is associated with the specific requesting component or entity. For the website, the identifier may be the characters in its URL address. If a mobile application is requesting a password, the identifier may be characters in the name of the application, or any text or numbers unique to the application, website, file, program, etc., and so on. It may be understood that the mobile computing device 604 may encrypt at least the identifier with a public key.

At step 616, the contactless card 602 receives the encrypted identifier and may decrypt it with a private key. The card 602 may then input at least the unique identifier, and in some examples with other types of suitable information, into a secure cryptographic hash function as data input. The cryptographic hash function may be, for example, any SHA (e.g., SHA-0, SHA-1, SHA-2, SHA-3) function. The hash output value may be then converted to one or more human-readable characters.

At step 618, the one or more human-readable characters may be generated as the password. Alternatively, the characters may be further transformed to add more layers of security and complexity and then the transformed characters may be generated as the secure password. At step 620, the secure password is packaged in at least NDEF file or message and sent to the mobile computing device 604. The NDEF message or file may also be encrypted by the contactless card 602 and decrypted on the mobile computing device side. Optionally, at step 622, the mobile computing device 604 may send an acknowledgment message to the contactless card 602 confirming the receipt of the secure password.

Similar to the random number generator discussed above, the cryptographic hash function may be entirely unique and integrated only into contactless card 602 and no other card, which enhances security. Another advantage is that the identifier allows the cryptographic hash function or cryptogram to safely and securely generate the same password for the same requesting component or entity. Thus, the password does not have to be saved or stored on the card or anywhere else. For instance, if a user revisits a website and needs to login with the secure password, the user may be able to tap the contactless card 602 to the user's mobile device and the hash function may be able to generate the required password so that the user may be able to login, as will be further described below. If the user desires a new password, then a new and different identifier (optionally along with other types of data) may be used to create the new password via the cryptographic hash function.

Figure 7:
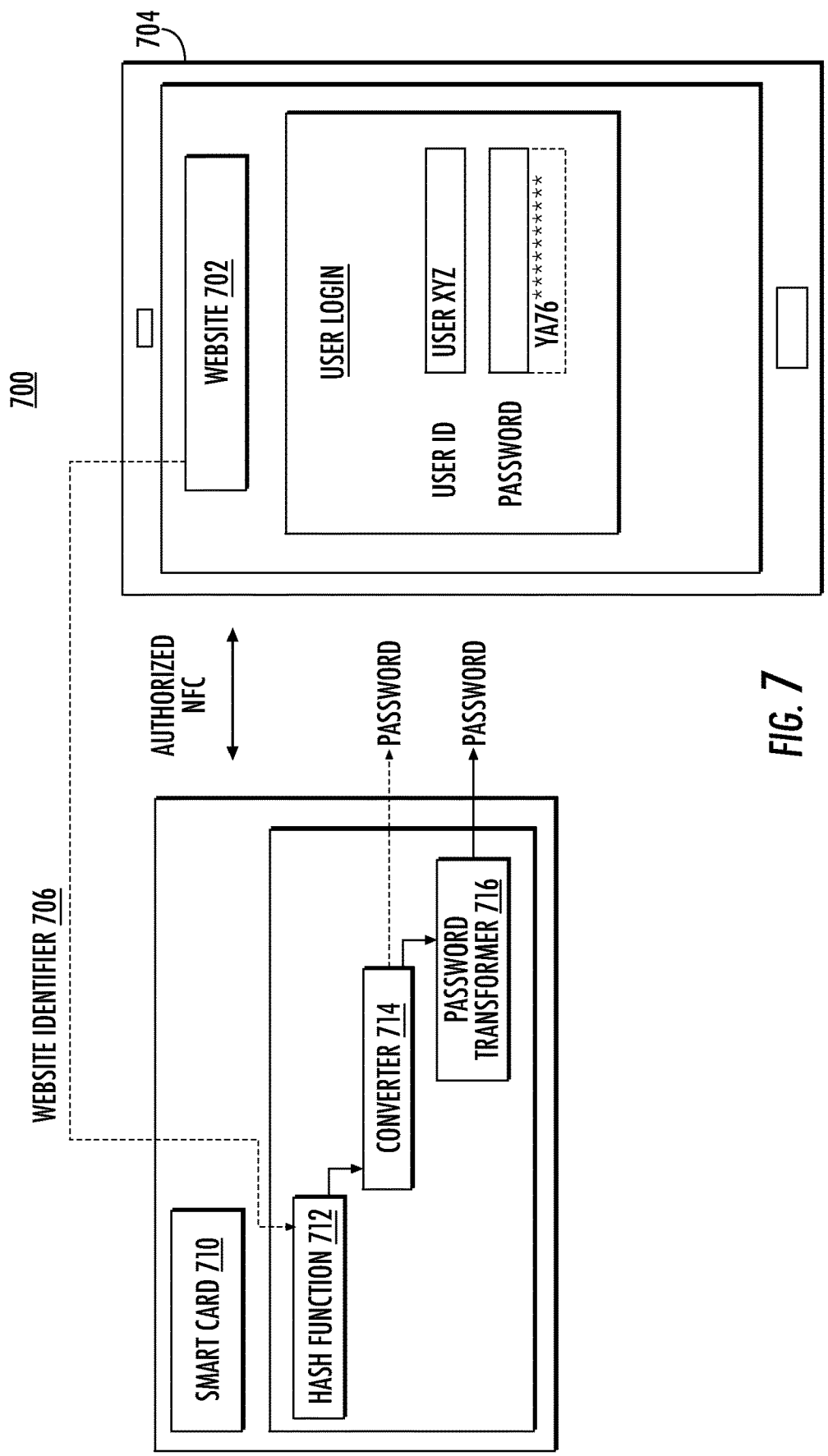
FIG. 7 illustrates an example secure password generation for a website in accordance with one or more embodiments.

FIG. 7 illustrates an example secure password generation 700 for a website 702 according to embodiments. The website 702 may be a social media website and may be accessed via mobile computing device 704 belonging to a user, as shown. If the user is a new user on website 702, the user may be required to create an account and protect that account with a user name (e.g., user XYZ) and a secure password. The website may require that the password be a specific length and contain certain characters. Thus, it may be understood that the password "requesting" component or entity is the website 702.

As shown, to initiate the generation of the secure password for the website 702, the user may tap or place the user's contactless smart card 502 to or near the mobile computing device 704 such that a secure and authenticated NFC communication is established. The contactless smart card 710 may receive from the website 702 a website identifier 706, which may be one or more unique characters contained in the URL of the website 702. For example, the website identifier 706 may be "chirp-" if the URL is "www.chirp-network.com."

The website identifier 706 (optionally along with other types of data, information, characters, numbers, etc.) may be fed into a cryptographic hash function 712 as input data. The cryptographic hash function 712 may then provide a hash output value to a converter 714, which may take the hash output value and convert it to one or more human-readable characters. The one or more human-readable characters may be directly provided to the website 702 as the password, as indicated by the dashed line. Moreover, in some examples, the one or more human-readable characters may be provided to a password transformer 716 to transform the characters in order to add more layers of security and complexity, which may then be provided as the password to the website 702.

After creating a new account on website 702, the user is required to login to the social media account with the user ID and the secure password. The user may tap or place the contactless card 710 to or near the mobile computing device 704 again, which allows the website 702 to provide the contactless card 710 the website identifier 706 again. Thus, the same, previously created password for the website 702 may be generated and provided to the website 702.

In examples, the mobile computing device 704 may incorporate an autofill feature, where the password is auto-populated in the password field, when the contactless card 710 is re-tapped to the computing device 704, as shown. The password may be obscured with a series of asterisk symbols. Advantageously, in at least this way, the password does not have to be saved either on the contactless card 710 or the mobile computing device 704 since the website identifier 706 with the unique cryptographic hash function of the card 710 can generate the same password every time it is requested. If the user desires to generate a new password for the website 702, a new website identifier may be used, for example, "chirp-network," etc.

It may be understood that the autofill feature may also be incorporated when using a random number generator to generate a secure password. For example, the contactless card may be tapped to or placed near the mobile computing device to trigger this feature, which may prompt a password manager application to retrieve the appropriate password for the above-described e-mail account for example and autofill or auto-populate a password field when logging into the e-mail account.

Figure 8:
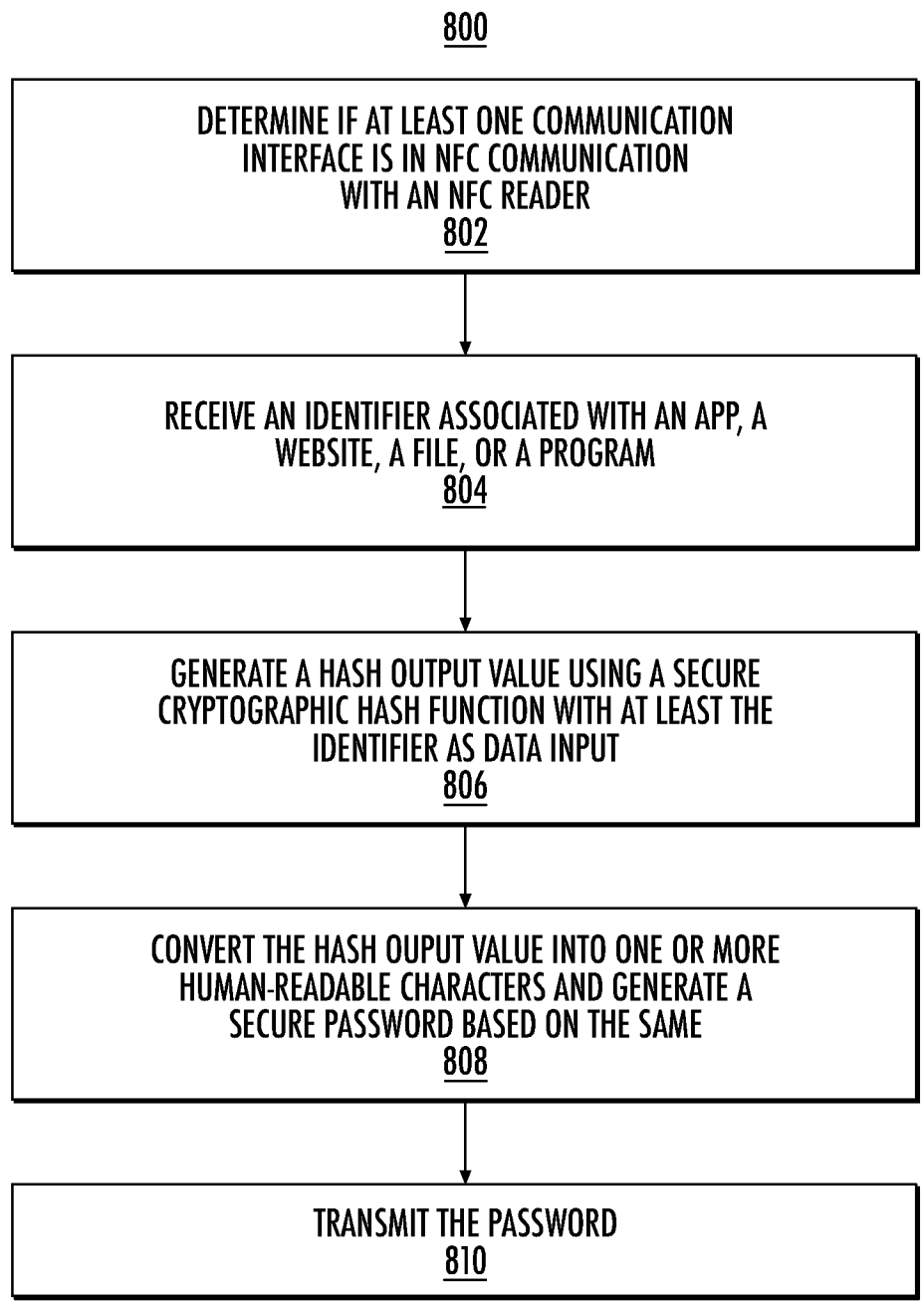
FIG. 8 illustrates an example flow diagram in accordance with one or more embodiments.

FIG. 8 illustrates an example flow diagram 800 according to one or more embodiments. The flow diagram 800 is related to securely generating and/or managing one or more passwords via an NFC-enabled contactless smart card. It may be understood that the features associated with the illustrated blocks may be performed or executed by a contactless card and processing circuitry contained therein. Moreover, it may be understood that the blocks in flow diagram 800 are not limited to any specific order, and the one or more blocks may be performed or executed simultaneously.

At block 802, it may be determined whether at least one communication interface of a contactless card is in NFC communication with an NFC reader. The NFC reader may be included, incorporated, or built into a mobile computing device, such as a smartphone. Thus, when the contactless card enters a magnetic field generated by the NFC reader, the circuitry in the contactless card may be activated to initiate the secure password generation process. Moreover, it may be verified whether the NFC communication between the card and the NFC reader is secure and/or authenticated.

At block 804, a password request from the mobile computing device may be received by the contactless card. Along with the request, an identifier associated with an application, a website, a file, or a program may be received. As described above, the identifier may be any suitable information that uniquely identifies the application, the website, the file, or the program "requesting" the secure password. For example, it may be a name associated with the application, website, file, or program, it may be a URL associated with the website, or it may be any numbers or text unique to the application, website, file, or program. The identifier may be received as an encrypted message (e.g., mobile device may encrypt the identifier with a public key). The contactless card may decrypt the message with a private key to obtain the identifier.

At block 806, at least the identifier (optionally along with other types of data or information) may be input to a cryptographic hash function, e.g., SHA-0, SHA-1, SHA-2, SHA-3, or any other suitable cryptogram as input data to output a hash output value. In at least this regard, the hash function is similar to the random number generator in that it is highly secure, verifiable, and unique to only the contactless card using it.

At block 808, the hash output value may be converted to one or more human-readable characters, which can be output as the secure password or may be further transformed to add layers of complexity and security to the password. The transformation, as described above, may involve rearranging the characters, capitalizing, lower-casing, adding, removing characters, or the like.

At block 810, the secure password may be encrypted and transmitted via at least one NDEF message or file. In some examples, the password may not be saved in the contactless card. The password may be transmitted only when the contactless card is determined to be in secure and authenticated NFC communication with the NFC reader of the computing device.

Moreover, in examples, when the contactless card is tapped to the computing device or placed within a threshold distance from the computing device, a password field corresponding to the application, website, file, or program with the password may be automatically filled or auto-populated.

In further examples, a second password request may be sent by the mobile computing device. The second request may be for a previously generated password, which would require the mobile computing device to send the previously used identifier for that password. Or if a new password is requested, a new identifier may be sent, which would generate a new hash output value, and in turn, a new password.

The components and features of the devices described above may be implemented using any combination of discrete circuitry, application specific integrated circuits (ASICs), logic gates and/or single chip architectures. Further, the features of the devices may be implemented using microcontrollers, programmable logic arrays and/or microprocessors or any combination of the foregoing where suitably appropriate. It is noted that hardware, firmware and/or software elements may be collectively or individually referred to herein as "logic" or "circuit."

At least one computer-readable storage medium may include instructions that, when executed, cause a system to perform any of the computer-implemented methods described herein.

Some embodiments may be described using the expression "one embodiment" or "an embodiment" along with their derivatives. These terms mean that a particular feature, structure, or characteristic described in connection with the embodiment is included in at least one embodiment. The appearances of the phrase "in one embodiment" in various places in the specification are not necessarily all referring to the same embodiment. Moreover, unless otherwise noted the features described above are recognized to be used together in any combination. Thus, any features discussed separately may be employed in combination with each other unless it is noted that the features are incompatible with each other.

With general reference to notations and nomenclature used herein, the detailed descriptions herein may be presented in terms of program procedures executed on a computer or network of computers. These procedural descriptions and representations are used by those skilled in the art to most effectively convey the substance of their work to others skilled in the art.

A procedure is here, and generally, conceived to be a self-consistent sequence of operations leading to a desired result. These operations are those requiring physical manipulations of physical quantities. Usually, though not necessarily, these quantities take the form of electrical, magnetic or optical signals capable of being stored, transferred, combined, compared, and otherwise manipulated. It proves convenient at times, principally for reasons of common usage, to refer to these signals as bits, values, elements, symbols, characters, terms, numbers, or the like. It should be noted, however, that all of these and similar terms are to be associated with the appropriate physical quantities and are merely convenient labels applied to those quantities.

Further, the manipulations performed are often referred to in terms, such as adding or comparing, which are commonly associated with mental operations performed by a human operator. No such capability of a human operator is necessary, or desirable in most cases, in any of the operations described herein, which form part of one or more embodiments. Rather, the operations are machine operations.

Some embodiments may be described using the expression "coupled" and "connected" along with their derivatives. These terms are not necessarily intended as synonyms for each other. For example, some embodiments may be described using the terms "connected" and/or "coupled" to indicate that two or more elements are in direct physical or electrical contact with each other. The term "coupled," however, may also mean that two or more elements are not in direct contact with each other, but yet still co-operate or interact with each other.

Various embodiments also relate to apparatus or systems for performing these operations. This apparatus may be specially constructed for the required purpose and may be selectively activated or reconfigured by a computer program stored in the computer. The procedures presented herein are not inherently related to a particular computer or other apparatus. The required structure for a variety of these machines will appear from the description given.

It is emphasized that the Abstract of the Disclosure is provided to allow a reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus, the following claims are hereby incorporated into the Detailed Description, with each claim standing on its own as a separate embodiment. In the appended claims, the terms "including" and "in which" are used as the plain-English equivalents of the respective terms "comprising" and "wherein," respectively. Moreover, the terms "first," "second," "third," and so forth, are used merely as labels, and are not intended to impose numerical requirements on their objects.

What has been described above includes examples of the disclosed architecture. It is, of course, not possible to describe every conceivable combination of components and/or methodologies, but one of ordinary skill in the art may recognize that many further combinations and permutations are possible. Accordingly, the novel architecture is intended to embrace all such alterations, modifications and variations that fall within the spirit and scope of the appended claims.

What is claimed is:

1. A method, comprising:
   determining, via one or more processors of a contactless card, whether at least one communication interface of the contactless card is in a near-field communication (NFC) communication with an NFC reader of a computing device;
   generating, via a secure random number generator of the contactless card, a random number;
   converting, via the one or more processors of the contactless card, the random number into a sequence of one or more human-readable characters, wherein the one or more human-readable characters are alphanumeric characters readable by a user;
   generating, via the one or more processors of the contactless card, a password based on the one or more human-readable characters, wherein the password is different from the sequence of the one or more human-readable characters, the generated password including alphanumeric characters, wherein the generation of the password includes transforming the one or more human-readable characters by: (i) rearranging or capitalizing at least a portion of the one or more human-readable characters and (ii) adding a predefined number of additional human-readable characters; and transmitting, via the at least one communication interface of the contactless card, the password to the computing device, the transmitted password being a master password for triggering execution of at least one application on the computing device for managing one or more passwords used for accessing at least another application.

2. The method of claim 1, wherein the random number generated by the secure random number generator has a predetermined length.

3. The method of claim 1, wherein the converting of the random number into the sequence of the one or more human-readable characters comprises applying, via the one or more processors, a code-based or key-based cryptography system to the random number.

4. The method of claim 1, wherein the password is transmitted from the contactless card to the computing device via one or more NFC data exchange format (NDEF) messages, wherein the password is included in a payload portion of the one or more NDEF messages and the payload portion is encrypted via a key.

5. The method of claim 4, further comprising receiving an acknowledgement (ACK) message from the computing device, the ACK message containing an indication that a first checksum value generated at the computing device matches a second checksum value provided in the one or more NDEF messages.

6. The method of claim 1, further comprising receiving a request or instruction to generate the password or wherein the password is automatically generated when an NFC communication is established and authenticated between the contactless card and the computing device.

7. A non-transitory computer-readable storage medium storing computer-readable program code executable by at least one processor to:
   determine, at a countless card, whether at least one communication interface of the contactless card is in a near-field communication (NFC) communication with an NFC reader of a computing device;
   generate, at the contactless card, a random number via a secure random number generator;
   convert, at the contactless card, the random number into a sequence of one or more human-readable characters, wherein the one or more human-readable characters are alphanumeric characters readable by a user;
   generate, at the contactless card, a password based on the one or more human-readable characters, wherein the password is different from the sequence of the one or more human-readable characters, the generated password including alphanumeric characters, wherein the generation of the password includes transforming the one or more human-readable characters by: (i) rearranging or capitalizing at least a portion of the one or more human-readable characters and (ii) adding a predefined number of additional human-readable characters; and
   transmit the password via the at least one communication interface of the contactless card to the computing device, the transmitted password being a master password for triggering execution of at least one application on the computing device for managing one or more passwords used for accessing at least another application.

8. The non-transitory computer-readable storage medium of claim 7, wherein the password is transmitted from the contactless card to the computing device via one or more NFC data exchange format (NDEF) messages, wherein the password is included in a payload portion of the one or more NDEF messages and the payload portion is encrypted via a key.

9. The non-transitory computer-readable storage medium of claim 8, wherein the computer-readable program code further causes the at least one processor to receive an acknowledgement (ACK) message from the computing device, the ACK message containing an indication that a first checksum value generated at the computing device matches a second checksum value provided in the one or more NDEF messages.

10. The non-transitory computer-readable storage medium of claim 7, wherein the computer-readable program code further causes the at least one processor to receive a request or instruction to generate the password or wherein the password is automatically generated when an NFC communication is established and authenticated between the contactless card and the computing device.

11. A contactless card, comprising:
    a memory;
    at least one communication interface; and
    one or more processors operable to execute stored instructions that, when executed, cause the one or more processors to:
       determine whether the at least one communication interface is in a near-field communication (NFC) communication with an NFC reader of a computing device;
       generate a random number via a secure random number generator;
       convert the random number into a sequence of one or more human-readable characters, wherein the one or more human-readable characters are alphanumeric characters readable by a user;
       generate a password based on the one or more human-readable characters, wherein the password is different from the sequence of the one or more human-readable characters, the generated password including alphanumeric characters, wherein the generation of the password includes transforming the one or more human-readable characters by: (i) rearranging or capitalizing at least a portion of the one or more human-readable characters and (ii) adding a predefined number of additional human-readable characters; and
       transmit the password via the at least one communication interface to the computing device, the transmitted password being a master password for triggering execution of at least one application on the computing device for managing one or more passwords used for accessing at least another application.

12. The contactless card of claim 11, wherein the random number generated by the secure random number generator has a predetermined length.

13. The contactless card of claim 11, wherein the conversion of the random number into the sequence of the one or more human-readable characters comprises the one or more processors further caused to apply a code-based or key-based cryptography system to the random number.

14. The contactless card of claim 11, wherein the password is transmitted from the contactless card to the computing device via one or more NFC data exchange format (NDEF) messages, wherein the password is included in a payload portion of the one or more NDEF messages and the payload portion is encrypted via a key.

15. The contactless card of claim 14, wherein the one or more processors are further caused to receive an acknowledgement (ACK) message from the computing device, the ACK message containing an indication that a first checksum value generated at the computing device matches a second checksum value provided in the one or more NDEF messages.

16. The contactless card of claim 11, wherein the one or more processors are further caused to receive a request or instruction to generate the password or wherein the password is automatically generated when an NFC communication is established and authenticated between the contactless card and the computing device.

17. The contactless card of claim 11, wherein the random number generator is stored in the contactless card and the generated password is stored in the memory of the contactless card.

\* \* \* \* \*